Nov. 19, 1957 O. E. KEALL 2,813,974

NARROW BAND SELECTIVE CIRCUIT ARRANGEMENTS

Filed Nov. 7, 1956

INVENTOR:
Oswold Edward Keall

BY:
Baldwin & Wight
ATTORNEYS

United States Patent Office 2,813,974

Patented Nov. 19, 1957

2,813,974

NARROW BAND SELECTIVE CIRCUIT ARRANGEMENTS

Oswold Edward Keall, West Hanningfield, England, assignor to Marconi's Wireless Telegraph Company Limited, London, England, a British company Application November 7, 1956, Serial No. 620,860

Claims priority, application Great Britain January 20, 1956

3 Claims. (Cl. 250—20)

This invention relates to narrow band selective circuit arrangements and more particularly to such arrangements for use at very high frequencies.

The main object of the invention is to provide improved, comparatively simple, narrow band selective circuit arrangements which will achieve narrow band selectivity and therefore, high signal/noise ratio without requiring the use of pre-detector filter elements which are themseleves of correspondingly narrow band selectivity and, therefore, expensive and difficult to design.

It is known in very high frequency receiving systems to feed incoming signals to a power divider whose outputs are fed to two channels each of which contains a mixer followed by an intermediate frequency filter, the local oscillations supplied to the two mixers differing by a small amount and the outputs from the intermediate frequency filters feeding into a multiplicative mixer or product detector. With this arrangement, if $f$ is the intermediate frequency and $\delta f$ is the small amount by which the local oscillator frequencies differ, there will be produced in the output from the product detector a frequency $\delta f$ with signals due to modulation superimposed thereon. Any frequency component of input energy in one channel will be separated in frequency by $\delta f$ from the corresponding component in the other channel and therefore noise, interference and signals present prior to the point of power division and occurring within the bandwidth of the intermediate frequency filters will alike produce output from the product detector. The noise bandwidth of such a known system is therefore determined by the bandwidth of the intermediate frequency filters and if narrow band selectivity with corresponding high signal/noise ratio is required the said intermediate frequency filters must be of correspondingly narrow band selectivity and will therefore be expensive and difficult to design. The present invention seeks to avoid this difficulty and limitation.

According to this invention a narrow band selective circuit arrangement comprises in combination a pair of mixers; a power divider connected to divide incoming signals between said mixers; a heterodyne oscillation source for each of said mixers, one of said sources being of a frequency substantially equal to the mean frequency of the incoming signals plus an intermediate frequency and the other being of a frequency substantially equal to said mean frequency minus said intermediate frequency; a pair of band pass filters each passing a band substantially centered on said intermediate frequency, one being fed from one mixer and the other from the other; a product detector connected to receive one of its inputs from one of said filters and the other from the other; an output circuit fed from said detector through a low or band pass filter.

Figure 1:
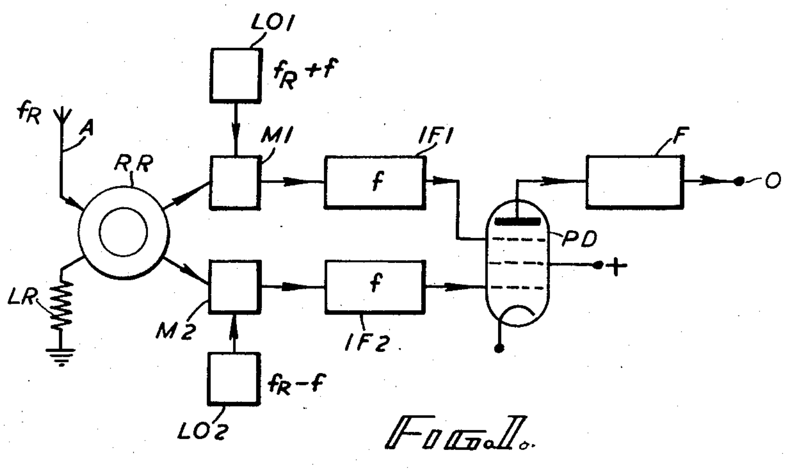

The invention is illustrated in and further explained in connection with the accompanying drawings in which Figure 1 is a simplified block diagram of a preferred embodiment, and Figures 2, 3, 4 and 5 are explanatory graphical figures.

Referring to Figure 1, incoming signals on a carrier frequency $f_R$ and derived, for example, from an aerial A, are fed to a power divider typified by a rat-race RR (any other suitable well known power divider may be used) and with which is associated the usual balancing absorber resistance LR. The two equal outputs from the power divider are fed one to each of two mixers M1 and M2 with each of which is associated a local oscillator LO1 or LO2. The mixer M1 is followed by an intermediate frequency filter IF1 and the mixer M2 by a similar intermediate frequency filter IF2. The two outputs from the two intermediate frequency filters are fed as inputs to be multiplied to a product detector PD exemplified as comprising a pentode with the input to the first grid supplied by the filter IF2 and the input to the third grid by the filter IF1, the second grid being a screen grid. Output from the product detector is fed through a low pass filter F (instead of a low pass filter a band pass filter could be used) to an output terminal O.

If $f$ is the mid-band frequency of the two similar intermediate frequency filters IF1 and IF2 the two local oscillator frequencies are chosen to differ by an amount 2F, that of one oscillator being $f_R+f$ and that of the other being $f_R-f$, where $f_R$ is, as stated, the incoming radio frequency. This choice of frequencies is shown conventionally in Figure 2.

Figure 2:
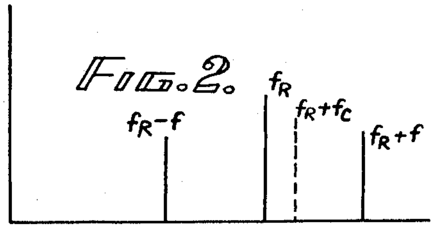
Figure 3:
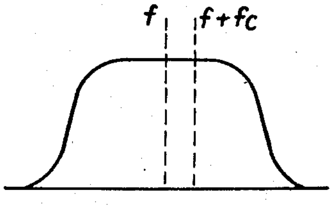
Figure 4:
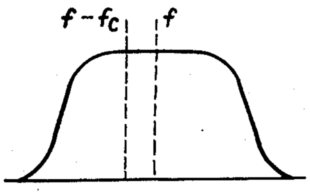

Suppose there is an incoming signal frequency $f_R+f_c$ slightly to one side of—as illustrated in Figure 2 slightly above—the signal carrier frequency. Corresponding frequencies $f+f_c$ and $f-f_c$ will occur in the intermediate frequency filters, displaced similarly but in opposite direction by the amount $f_c$ with regard to the mid-frequency $f$ thereof. This is shown conventionally in Figures 3 and 4, where the curves represent the pass bands of the two intermediate frequency filters. Thus the positions of corresponding frequency components in the two intermediate frequency channels are reversed with respect to the mid-frequency $f$.

Figure 5:
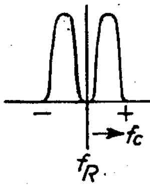

Consider what would happen if an incoming signal were swept in frequency across the pass band of the receiver whose characteristics are as represented in Figure 2. This signal will first give rise to corresponding components at opposite ends of the pass bands of the two intermediate frequency channels and these components will, as the receiver band is swept through, cross at the centre of the intermediate frequency band and move towards the opposite ends of the band. Since output from the product detector will be at a frequency equal to the frequency difference $2f_c$ between the corresponding components, the resultant output frequency from the said detector will change from one equal to that of the intermediate frequency bandwidth through zero back to a frequency equal to the said bandwidth again. If, therefore, a low pass filter (the filter F) follows the product detector, there will be no output if the frequency difference between the corresponding components in the two intermediate frequency channels is outside the pass range of the said low pass filter. In this way an effectively narrow noise bandwidth is obtained—it is determined by the post-detector filter—without requiring corresponding narrow band selectivity in the intermediate frequency filters IF1 and IF2. This is best shown in Figure 5 which represents the resulting signal in the output of the product detector.

As will be apparent to those skilled in the art, the two channels should be such that the delay of each, measured from the point of division at the power divider, is substantially the same as that of the other.

I claim:

1. A narrow band selective circuit arrangement comprising in combination a pair of mixers; a power divider connected to divide incoming signals between said mixers; a heterodyne oscillation source for each of said mixers, one of said sources being of a frequency substantially equal to the mean frequency of the incoming signals plus an intermediate frequency and the other being of a frequency substantially equal to said mean frequency minus said intermediate frequency; a pair of band pass filters each passing a band substantially centred on said intermediate frequency, one being fed from one mixer and the other from the other; a product detector connected to receive one of its inputs from one of said filters and the other from the other; an output circuit fed from said detector through a low or band pass filter.

2. An arrangement as claimed in claim 1 wherein the product detector is a multi-grid valve having one control grid fed from one band pass filter and another control grid fed from the other.

3. In combination a source of very high frequency signals; a power divider fed from said source; a pair of mixers connected each to receive one of its inputs from said divider; a pair of local oscillators connected to supply said mixers with their second inputs, one from one oscillator and the other from the other, said oscillators being respectively of frequencies $f_R+f$ and $f_R-f$ (where $f_R$ is the mean value of said very high frequency and $f$ is a predetermined intermediate frequency); a pair of intermediate frequency band pass filters, one fed from each mixer; a product detector fed from the two band pass filters; and an output circuit fed from said product detector.

References Cited in the file of this patent

UNITED STATES PATENTS

| | | |
|---|---|---|
| 2,256,199 | Hansell | Sept. 16, 1941 |
| 2,723,345 | Lewinter | Nov. 8, 1955 |